United States Patent [19]

Shimpo et al.

[11] Patent Number: 6,130,328
[45] Date of Patent: Oct. 10, 2000

[54] PROCESS FOR PREPARING CARBOXYPOLYSACCHARIDE

[75] Inventors: Masafumi Shimpo; Hisashi Sakaitani; Hidechika Wakabayashi; Toshiaki Kozaki, all of Tokyo, Japan

[73] Assignee: Mitsubishi Gas Chemical Company, Inc., Tokyo, Japan

[21] Appl. No.: 09/186,465

[22] Filed: Nov. 5, 1998

[30] Foreign Application Priority Data

Nov. 10, 1997 [JP] Japan ..................................... 9-307470
Apr. 24, 1998 [JP] Japan .................................. 10-115176

[51] Int. Cl.⁷ ............................ C08B 31/18; C08B 33/08; C08B 35/08; C08B 37/00; C07C 333/00
[52] U.S. Cl. ............................. 536/105; 536/124; 564/75
[58] Field of Search .................................... 536/124, 105; 564/75

[56] References Cited

U.S. PATENT DOCUMENTS 3,848,048  11/1974  Moore ........................................ 423/22

FOREIGN PATENT DOCUMENTS 1401824   7/1975  United Kingdom .
97/02293  1/1997  WIPO .

OTHER PUBLICATIONS

R.E. Harmon et al., "Air–Oxidation of Starch using Quinquevalent as Catalyst", *Die Starks*, vol. 23, No. 4, Apr. 1, 1971, pp. 125–128.

Database WPI, Derwent Publications Ltd., AN 125418, Jan. 30, 1993; SU 1791752.

*Primary Examiner*—Howard C. Lee
*Attorney, Agent, or Firm*—Antonelli, Terry, Stout & Kraus, LLP

[57] ABSTRACT

There is herein disclosed a process for preparing a carboxypolysaccharide by oxidizing a polysaccharide with a combination of a transition metal compound and an oxidizing agent, said process comprising the step of separating the transition metal from a reaction mixture with a chelating agent. According to the present invention, the transition metal can be removed to a low concentration of less than 100 ppm from an aqueous solution including the transition metal and the tricarboxypolysaccharide. The process of the present invention is important to reduce the loss of a transition metal catalyst such as the ruthenium catalyst and to industrially manufacture a purified tricarboxypolysaccharide.

4 Claims, No Drawings

PROCESS FOR PREPARING CARBOXYPOLYSACCHARIDE

BACKGROUND OF THE INVENTION

1. Field of the Invention

The present invention relates to a process for preparing a carboxypolysaccharide by the oxidation of a polysaccharide. The carboxypolysaccharide which can be obtained by the present invention can be utilized as any of a scale deposition inhibitor, a pigment dispersant, a sizing agent, a concrete blending agent, a detergent builder and the like.

2. Description of the Related Art

Heretofore, acrylic acid polymers and acrylic acidmaleic acid copolymers have been industrially been manufactured as detergent builders. However, these synthetic polycarboxylic acids comprise a vinyl polymer structure which is not general as a natural polymeric chemical structure, and hence, it is known that there is a problem that the biodegradability of the synthetic polycarboxylic acids by microorganisms is very low. On the other hand, a polycarboxylic acid prepared by the oxidative carboxylation of a polysaccharide has the high biodegradability, and it can be expected that this polycarboxylic acid is useful to solve the above problem as a biodegradable builder.

Various methods for preparing a carboxypolysacchaide by oxidizing the polysaccharide are known so far. For example, Japanese Patent Publication No. 1281/1974 discloses a method for oxidizing the polysaccharide by the use of a combination of periodic acid and a chlorite, or a hypochlorite, and it is further described herein that a dicarboxystarch obtained by oxidizing the $C_2$ and $C_3$ positions of a monosaccharide which is a constitutional unit of the polysaccharide has a detergent builder function. As methods for preparing a tricarboxypolysaccharide by oxidizing the polysaccharide, techniques which comprises treating starch with a periodate to form an aldehyde, and then carrying out the oxidative carboxylation of the aldehyde with dinitrogen tetraoxide are disclosed in Japanese Patent Publication No. 40552/1972 and Czechoslovakia Patent No. 235576. In these methods described in these publications, however, the expensive periodate needs to be used, and for this reason, these known methods are not industrially desirable.

Japanese Patent Application Laid-open No. 71601/1997 discloses a process for preparing a tricarboxystarch by carboxylating starch with a hypochlorite as an oxidizing agent in the presence of a ruthenium catalyst. Since ruthenium which is used herein is an extremely expensive transition metal, the loss of ruthenium is severely inhibited in a tricarboxystarch manufacturing process. According to the investigation by the present inventors, however, the tricarboxystarch produced by the above method contains a certain amount of ruthenium, which means the loss of ruthenium, and moreover, there is a problem that an operation of removing ruthenium from the produced tricarboxystarch is required.

As techniques of removing ruthenium from the tricarboxypolysaccharide produced by oxidizing a polysaccharide such as starch, there are a method which comprises oxidizing the ruthenium catalyst to form ruthenium tetraoxide, and then eliminating it by distillation or extraction with an organic solvent, a method which comprises adsorbing the ruthenium catalyst on an organic or an inorganic carrier, and a method which comprises extracting the ruthenium catalyst at ordinary temperature with a chelating agent. However, the certain amount of ruthenium contained in the tricarboxypolysaccharide is inactive in the above removal operation, so that it has been extremely difficult to lower the ruthenium content contained in the tricarboxypolysaccharide to less than 100 ppm.

SUMMARY OF THE INVENTION

In order to solve the above problems of the conventional techniques, the present invention has been developed, and an object of the present invention is to provide a process for industrially preparing a carboxypolysaccharide by oxidizing a polysaccharide in which a transition metal such as ruthenium used in combination with an oxidizing agent can effectively be removed.

The present inventors have intensively investigated on a technique of removing a transition metal from a carboxypolysaccharide produced by the oxidation of a polysaccharide, and as a result, it has been found that the transition metal can effectively be removed from an organic solvent by treating a reaction mixture with a chelating agent. In consequence, the present invention has been completed.

That is to say, the present invention is directed to a process for preparing a carboxypolysaccharide by oxidizing a polysaccharide with a combination of a transition metal compound and an oxidizing agent, said process comprising the step of separating the transition metal from a reaction mixture with a chelating agent.

DETAILED DESCRIPTION OF THE INVENTION

A carboxypolysaccharide referred to in the present invention means a tricarboxypolysaccharide having an average molecular weight of 1,000 to 100,000 in which a primary alcohol or an ester at the $C_6$ position of a saccharic pyranose ring constituting a polysaccharide is oxidized or hydrolyzed as much as 10 mol % or more on the average, so that the primary alcohol or the ester is converted into a carboxyl group or its salt, and simultaneously the $C_2$ and $C_3$ positions of the pyranose ring are cleaved and secondary alcohols at the $C_2$ and $C_3$ positions are oxidized as much as 10 mol % or more, so that the secondary alcohols are converted into carboxyl groups or a salt thereof.

Examples of the polysaccharide which can be used in the present invention include α-bonding type polysaccharides such as starches, amylose, amylopectin, pectin, protopectin and pectinic acid, and β-bonding type polysaccharides such as celluloses. From the viewpoint of the easiness of a reaction, the starches are preferable. Examples of the starches include corn starch, potato starch, tapioca starch, wheat starch, sweet potato starch and rice starch, and in addition, water-soluble starches obtained by decreasing the molecular weight of these starches are also usable. The polysaccharide can be used at a reaction concentration in the range of 0.1 to 80% by weight, preferably 1 to 50% by weight.

The oxidization of the polysaccharide in the present invention can be carried out by a combination of a transition metal compound and an oxidizing agent. Examples of the transition metal compound include ruthenium compounds. Typical examples of the ruthenium compounds which can be used in the present invention include ruthenium metal; ruthenium oxides such as ruthenium dioxide and ruthenium tetraoxide; ruthenates such as sodium ruthenate; ruthenium halides such as ruthenium chloride and ruthenium bromide; ruthenium nitrate; ruthenium sulfate; ruthenium carboxylates such as ruthenium acetate; and ruthenium complexes such as ammonium hexachlororuthenate, potassium hexachlororuthenate, potassium pentachloroaquaruthenate, ammonium pentachloroaquaruthenate, potassium pentachloronitrosylruthenate, hexaammineruthenium chloride, hexaammineruthenium bromide, hexaammineruthenium iodide, nitrosylpentaammineruthenium chloride, hydroxonitrosyltetraammineruthenium nitrate, ruthenium ethylenediaminetetraacetate and ruthenium dodecacarbonium.

In addition, a ruthenium-supporting material obtained by supporting the ruthenium metal on a carrier can also be used. Typical examples of the ruthenium-supporting material include ruthenium-supporting alumina, ruthenium-supporting carbon, ruthenium-supporting silica-alumina and ruthenium-supporting titania. Examples of the preferable ruthenium compounds include water-soluble ruthenium compounds such as ruthenium chloride, ruthenium bromide, potassium pentachloroaquaruthenate, ammonium pentachloroaquaruthenate, sodium ruthenate, ruthenium nitrate, ruthenium acetate, hexaammineruthenium chloride, hexaammineruthenium bromide, ruthenium ethylenediaminetetraacetate. The amount of the ruthenium compound to be used is a catalytic amount in the range of 0.00001 to 1.0 mol, preferably 0.0001 to 0.1 mol per mol of the monosaccharide unit constituting the polysaccharide which is the raw material.

Examples of the oxidizing agent which can be used in the present invention include halogens, halogenic acids and their salts, oxygen, peracids, hydrogen peroxide, persulfuric acid and its salts, and ferricyanides. Typical examples of the oxidizing agent include halogen molecules such as chlorine and bromine; halogen oxides such as dichlorine monoxide, chlorine dioxide, dibromine monoxide and bromine dioxide; perhalogenic acids such as periodic acid and perchloric acid as well as their salts; halogenic acids such as bromic acid and chloric acid as well as their salts; halogenous acids such as bromonous acid and chlorous acid as well as their salts; hypohalogenous acids such as hypobromous acid and hypochlorous acid as well as their salts; oxygen; peracids such as performic acid, peracetic acid and perbenzoic acid; hydroperoxides such as cumene hydroperoxide and benzyl hydroperoxide; peroxides such as tert-butylbenzyl oxide and dibenzoyl oxide; persulfuric acids such as peroxydisulfuric acid and their salts; Caro's acid; and ferricyanides such as potassium ferricyanide and sodium ferricyanide. Among these oxidizing agents, the water-soluble halogenic acids and their salts are preferable. Moreover, the amount of the oxidizing agent to be used is in the range of 0.5 mol to 10 mol, preferably 1.5 mol to 8 mol per mol of the raw material.

As a reaction solvent for use in the present invention, there can usually be used an aqueous solvent or a mixed solvent of the aqueous solvent and a solvent stable to water and the oxidizing agent. Typical preferable examples of the solvent stable to the oxidizing agent include organic acids such as acetic acid; halogenated hydrocarbons such as carbon tetrachloride, chloroform and dichloromethane; methane series saturated hydrocarbons such as pentane and hexane; and paraffin series hydrocarbons such as cyclohexane. Furthermore, in the case of the mixed solvent which is incompatible with water, stirring can sufficiently be made to accelerate a reaction rate.

In the present invention, the reaction is carried out at a reaction temperature of 0 to 100° C. at a pH of 1 to 13, while the oxidizing agent is slowly added with stirring to a mixture of the polysaccharide, the transition metal compound, e.g. the ruthenium compound and the aqueous solvent or the mixed solvent of the aqueous solvent and the solvent stable to water to produce high valence ruthenium.

In the resultant reaction mixture, the produced carboxypolysaccharide, the ruthenium compound and the solvent are included. Here, the high valence ruthenium means ruthenium in which a ruthenium atom has a valence of +6, +7 or +8.

For the separation of the transition metal in the present invention, a chelating agent is used. In the case that a water-insoluble organic solvent is used in an extraction step, the separation operation comprises (1) a step in which the reaction mixture is treated with the chelating agent, and (2) a step in which the transition metal is extracted and removed with the water-insoluble organic solvent. On the other hand, in the case that a watersoluble organic solvent is used, the separation operation comprises (1) a step in which the reaction mixture is treated with the chelating agent, and (2) a step in which the water-soluble organic solvent is added thereto to carry out the extraction and to simultaneously precipitate and separate the carboxypolysaccharide.

In the present invention, the chelating agent is not restricted, so long as it can bond to the transition metal to form a salt or a complex. Examples of the chelating agent include an N,N-coordination type (the chelating agent having the coordination of N-M-N to a metallic atom M), an N,O-coordination type (similarly, N-M-O), an O,O-coordination type (similarly, O-M-O), an N,S-coordination type (similarly, N-M-S), an S,S-coordination type (similarly, S-M-S) and an S,O-coordination type (similarly, S-M-O). Typical examples of the N,N-coordination type chelating agent include α-dioximes (dimethylglyoxime, benzyldioxime, furildioxime, nioxime, cyclohexanedionedioxime and the like), 2,2'-bipyridine, bipyridyls (2,2'-bipyridyl), phenanthrolines (1,10'-phenanthroline, cuproine, neocuproine, bathophenanthroline and the like), phenylenediamines, diphenylcarbazide and diphenylcarbazone. Typical examples of the N,O-coordination type chelating agent include Complexons (EDTA, NTA, CDTA and the like), polyaminophosphoric acids including a phosphoric acid in place to a carboxylic acid (EDTMP, PDTMP and the like), oxines (8-hydroxyquinolines) (halogenated derivatives such as dichlorooxine, dibromooxine and diiodooxine, and alkylated derivatives such as methyloxine), oximes (pyridine-2-aldoxime, cyclohexanoneoxime, salicylaldoxime, α-benzoyloxime and the like), anthranilic acid, quinaldic acid, quinoline-8-carboxylic acid, α-nitroso-β-naphthol, β-nitroso-α-naphthol, nitroso R salts (1-nitroso-2-oxy-3,6-naphthalenedisulfonic acid), and chelating agents having an o-hydrodiazo and an o,o'-dihydrodiazo skeleton structure (chalcone, pyridylazoresorcin, thorin, zincon and the like). Typical examples of the O,O-coordination type chelating agent include cupferron (N-nitrosophenylhydroxylamine salt), neocupferron (N-nitrosonaphthylhydroxylamine ammonium salt), N-benzoylphenylhydroxylamine, β-diketones (acetylacetone, thenoyltrifluoroacetone, dibenzoylmethane, trifluoroacetylacetone and the like), tiron, phenylfluorone, alizarin, morin, quinalizarin, haematoxylin, stilbazo, Pyrocatechol Violet, salicylic acids (sulfosalicylic acid, resorcylic acid, p-aminosalicylic acid, chromotropic acid, 1-hydroxy-2-naphthoic acid, 2-hydroxy-3-naphthoic acid, aluminon and the like), and 2-hydroxy-1-naphthoaldehyde. Typical examples of the N,S-coordination type chelating agent include dithizone, thiooxine of a thiooxine (8-mercaptoquinoline), and ethylenethiourea of a 2-thioimidazolidine. Typical examples of the S,S-coordination type chelating agent include toluene-3,4-dithiol, dialkyldithiocarbamates (sodium dimethyldithiocarbamate, sodium diethyldithiocarbamate and sodium dibenzyldithiocarbamate), 2-mercaptobenzothiazole, bismuthiol II (3-phenyl-5-mercapto-1,3,4-thiodiazole-2- thione), rubeanates, xanthogenates and thionalide. A typical example of the S,O-coordination type chelating agent is 3-mercapto-4-hydroxytoluene.

In the present invention, an aqueous solution containing the transition metal and the carboxypolysaccharide is treated at a high temperature in the presence of the chelating agent. A treatment temperature is in the range of 60 to 140° C., preferably 80 to 120° C. If the treatment temperature is too low, much time is required to heighten the extraction efficiency of the transition metal, and if it is too high, the decomposition of the carboxypolysaccharide inconveniently occurs. The time of the high-temperature treatment depends on the conditions of the treatment, but it is in the minge of 5 minutes to 12 hours, preferably 30 minutes to 8 hours. By applying or reducing a pressure at the time of the high-temperature treatment, the temperature, the time and the like for the high-temperature treatment can be altered. In addition, by adding an oxidizing agent or a reducing agent at the addition of the chelating agent, the removal ratio of the transition metal can be heightened. Typical examples of the usual oxidizing agent include halogens, halogenic acids and their salts, hypohalogenates, peracids such as acetic peracid, peroxides such as hydrogen peroxide, and persulfuric acid and its salts. Typical examples of the usual reducing agent include sulfites, hydrazine salts, and hydroxylamine salts and lower alcohols (methanol, ethanol and 2-propanol).

In the case that the water-insoluble organic solvent is used in the separation of the transition metal which is conducted after the treatment by the chelating agent, the preferable chelating agent contains at least one sulfur atom in its molecule, and examples of the more preferable chelating agent include dithiocarbamates represented by the general formula $R^1R^2N-C(=S)-SM$ (wherein $R^1$ and $R^2$ are each hydrogen, an alkyl group having 1 to 10 carbon atoms or an aryl group having 6 to 14 carbon atoms; and M is a metallic element) and dithiocarboxylates represented by the general formula $R^3-O-C(=S)-SM$ (wherein $R^3$ is an alkyl group having 1 to 10 carbon atoms or an aryl group having 6 to 14 carbon atoms; and M is a metallic element). Examples of the dithiocarboxylates include potassium ethylxanthogenate and the like. Examples of the most preferable chelating agent include dialkyldithiocarbamates, and typical examples of the dialkyldithiocarbamates include sodium dimethyldithiocarbamate, sodium diethyldithiocarbamate and sodium dibutyldithiocarbamate. These chelating agents can be used in the form of various metallic salts, but since each chelating agent is to be substituted by another metal during an exchange reaction or the like, it is preferably used in the form of alkali metal salts or in a metal-free state. In addition, the chelating agent can also be used after halogenation, alkylation, hydroxylation or the like.

Examples of the water-insoluble organic solvent include aliphatic hydrocarbons, aromatic hydrocarbon, halogenated hydrocarbons, alcohols having 4 or more carbon atoms, ketones having 4 or more carbon atoms, esters having 4 or more carbon atoms, and ethers having 4 or more carbon atoms. These organic solvents may be used singly or in the form of a mixture to two or more thereof. Preferable examples of the water-insoluble organic solvent include organic solvents having a low viscosity and a large specific gravity difference between the organic solvent itself and the aqueous solution including the transition metal and the carboxypolysaccharide, and combinations of these organic solvents.

After the aqueous solution including the transition metal and the carboxypolysaccharide is heated in the presence of the chelating agent, the above organic solvent is added to this mixture. If the high-temperature treatment temperature of the aqueous solution can be set to a sufficiently high level, the organic solvent may be added simultaneously with or before the high-temperature treatment of the aqueous solution including the transition metal and the carboxypolysaccharide are heated in the presence of the chelating agent. In the high-temperature treatment in the presence of the chelating agent and the extraction with the organic solvent, a pH is not restricted, but it is preferably in the range of from neutral to alkali.

After the aqueous solution has been mixed with the organic solvent, the separation of a solution is made. For the mixing of the aqueous solution and the organic solvent, a known extracting equipment such as a single-stage or a multi-stage mixer settler, an inline mixer or RDC can be used. The repetition of the heating and the extraction is also effective to enhance the removal ratio of the transition metal. The above procedure can make it possible to remove ruthenium from the tricarboxypolysaccharide to a low concentration of a ppm level, whereby the purified aqueous tricarboxypolysaccharide solution can be obtained.

On the other hand, in the case that the water-soluble organic solvent is used in the separation of the transition metal which is to be conducted after the treatment with the above chelating agent, examples of the preferable chelating agent include oximes represented by the general formula $R^4R^5C=NOH$ (wherein $R^4$ and $R^5$ are each hydrogen, an alkyl group having 1 to 10 carbon atoms, an aryl group having 6 to 14 carbon atoms or a pyridyl group); dioximes represented by the general formula $HON=CR^6-CR^7=NOH$ (wherein $R^6$ and $R^7$ are each hydrogen, an alkyl group having 1 to 10 carbon atoms, an aryl group having 6 to 14 carbon atoms or a pyridyl group); bipyridyls, phenanthrolines, quinolines, aminonaphthalenes; phenylenediamines; benzothiazoles, 2-thio-imidazolidines and rubeanic acid. Typical examples of the oximes include pyridiene-2-aldoxime and cyclohexaneoxime; examples of α-dioximes include dimethylglyoxime, α-benzyldioxime and α-furyldioxime; examples of the bipyridyls include 2,2'-bipyridyl and terpyridyl; examples of the phenanthrolines include 1,10'-phenanthroline, neocuproine and bathophenanthroline; examples of the quinolines include 8-hydroxyquinoline (oxine) and 8-mercaptoquinoline; examples of the aminonaphthalenes include 1,8-diaminonaphthalene; an example of the phenylenediamines includes phenylenediamine; an example of the benzothiazoles includes 2-mercaptobenzothiazole; and an example of the 2-thio-imidazolidines includes ethylenethiourea. It should be noted that these examples are not restrictive.

Each chelating agent can be used in the form of a metallic salt, but since it is to be substituted by another metal during the exchange reaction or the like, it is preferably used in a metal-free state. In addition, the chelating agent can be hydroxylated prior to its use. No particular restriction is put on the amount of the chelating agent, but it is preferably in the range of 0.1 to 100,000 mols per mol of the transition metal in the carboxypolysaccharide.

No particular restriction is put on the water-soluble organic solvent, so long as it is a poor solvent to the carboxypolysaccharide, but the water-soluble organic solvent which can dissolve a complex (a complex salt) of the transition metal and the chelating agent is preferable, and water-soluble organic solvents such as lower alcohols typified by methanol, ethanol and 2-propanol, acetone and acetonitrile are particularly preferable.

The water-soluble organic solvent may be added to a mixture obtained by heating the aqueous solution including the transition metal and the carboxypolysaccharide in the presence of the chelating agent, or alternatively, this mixture may be added to the organic solvent. No particular restriction is put on the amount of the organic solvent to be used, but it is preferably 0.05 to 100 times, preferably 0.1 to 10 times, as much as the volume of the mixture of the chelating agent, the transition metal and the carboxypolysaccharide. In the high-temperature treatment in the presence of the chelating agent and the extraction with the water-soluble organic solvent, the pH of the reaction solution is not restricted, but it is preferably in the range of from neutral to alkali.

Repeating the operations of the high-temperature treatment in the presence of the chelating agent, the extraction with the water-soluble organic solvent and the separation of a precipitate is effective to enhance the removal ratio of the transition metal. The above procedure permits ruthenium to be removed from the tricarboxypolysaccharide to a ppm level without using a conventional extraction step with a water-insoluble organic solvent, whereby the purified tricarboxypolysaccharide can be obtained.

According to the present invention, the transition metal can be removed to a low concentration of less than 100 ppm from an aqueous solution including the transition metal and the tricarboxypolysaccharide. The process of the present invention is important to reduce the loss of a transition metal catalyst such as the ruthenium catalyst and to industrially manufacture the purified tricarboxypolysaccharide.

Next, the present invention will be described in detail with reference to examples, but the scope of the present invention should not be limited to these examples.

EXAMPLE 1

In a 300 ml round pyrex flask equipped with a stirrer, a thermometer and a pump were placed 50 ml of water, 2 g of corn starch and 20 mg of ruthenium chloride, and the mixture was then cooled to a temperature of 20° C. with stirring on a cold water bath. To this mixture, a 6.7 wt % aqueous sodium hypochlorite solution was added in an amount of 5 mols per mol of the starch over 4.5 hours. The pH of the reaction solution was controlled to 4.0 by adding an aqueous sodium hydroxide solution.

After completion of the reaction, ruthenium tetroxide was extracted three times with 100 ml of carbon tetrachloride to remove it. After the extraction, the pH of the reaction solution was regulated with an aqueous sodium hydroxide solution so as to be in the range of 7 to 8, and methanol was then added thereto in an amount of a two-fold volume, thereby obtaining a white precipitate. An operation of dissolving the precipitate in water and then adding methanol to bring about the precipitation was repeated twice, and the resulting white product was then dried in a vacuum at 60° C. for 5 hours to obtain 2.1 g of a product A.

The product A was analyzed by $^{13}$C-NMR, IR and ICP, and as a result, the product was a sodium salt of a tricarboxystarch in which 100 mol % of a primary alcohol at the $C_6$ position of a glucopyranose unit constituting the raw material corn starch was oxidized into a carboxyl group and simultaneously the $C_2$ and $C_3$ positions were cleaved, and 55 mol % of secondary alcohols at the $C_2$ and $C_3$ positions was oxidized into carboxyl groups. In the product, a ruthenium content was 320 ppm.

1.0 g of the product A was dissolved in 100 g of water, and 1.0 g of sodium diethyldithiocarbamate was then added. The resultant mixture was heated at 96° C. for 2 hours in a 100 ml four-necked pyrex flask equipped with a stirrer, a thermometer and a reflux condenser. After cooled to ordinary temperature, the solution was transferred to a separatory funnel, and then extracted three times with ethyl acetate. The resultant aqueous phase was concentrated and methanol was then added thereto, and a tricarboxystarch was obtained in the form of its sodium salt. The thus obtained sodium salt of the tricarboxystarch including ruthenium was analyzed by ICP, so that a ruthenium content was 23 ppm (a ruthenium removal ratio=92%).

EXAMPLE 2

The same extraction as in Example 1 was conducted except that the operation of adding 1.0 g of sodium diethyldithiocarbamate and then heating at 96° C. for 2 hours in Example 1 was replaced with an operation of stirring at 60° C. for 2 hours. An obtained sodium salt of a tricarboxystarch including ruthenium was analyzed by ICP, so that a ruthenium content was 95 ppm (a ruthenium removal ratio=70%).

EXAMPLE 3

5.0 g of the product A obtained in Example 1 was dissolved in 100 g of water, and 0.5 g of sodium diethyldithiocarbamate was then added. The resultant mixture was heated at 94° C. for 2 hours in a 100 ml four-necked pyrex flask equipped with a stirrer, a thermometer and a reflux condenser. After cooled, the solution was transferred to a separatory funnel, and then extracted once with 77 g of chloroform. The resultant aqueous phase was concentrated and methanol was then added thereto, and a tricarboxystarch was obtained in the form of its sodium salt. In the thus obtained sodium salt of the tricarboxystarch, a ruthenium content was 15 ppm (a ruthenium removal ratio=95%).

EXAMPLE 4

1.0 g of the product A obtained in Example 1 was dissolved in 100 g of water, and 1.0 g of sodium diethyldithiocarbamate was then added. The resultant mixture was heated at 96° C. for 2 hours in a 100 ml four-necked pyrex flask equipped with a stirrer, a thermometer and a reflux condenser. After cooled, the solution was transferred to a separatory funnel, and then extracted once with 50 g of chloroform. The resultant aqueous phase was concentrated and methanol was then added thereto, and a tricarboxystarch was obtained in the form of its sodium salt. In the thus obtained sodium salt of the tricarboxystarch, a ruthenium content was 1.5 ppm (a ruthenium removal ratio=99.5%).

EXAMPLE 5

5.0 g of the product A obtained in Example 1 was dissolved in 100 g of water, and 0.5 g of potassium ethylxanthogenate was then added. The resultant mixture was heated at 94° C. for 2 hours in a 100 ml four-necked pyrex flask equipped with a stirrer, a thermometer and a reflux condenser. After cooled, the solution was transferred to a separatory funnel, and then extracted once with 77 g of chloroform. The resultant aqueous phase was concentrated and methanol was then added thereto, and a tricarboxystarch was obtained in the form of its sodium salt. In the thus obtained sodium salt of the tricarboxystarch, a ruthenium content was 22 ppm (a ruthenium removal ratio=93%).

EXAMPLE 6

5.0 g of the product A obtained in Example 1 was dissolved in 100 g of water, and 0.5 g of oxine (8-hydroxyquinoline) was then added. The resultant mixture was heated at 94° C. for 2 hours in a 100 ml four-necked pyrex flask equipped with a stirrer, a thermometer and a reflux condenser. After cooled, the solution was transferred to a separatory funnel, and then extracted once with 77 g of chloroform. The resultant aqueous phase was concentrated and methanol was then added thereto, and a tricarboxystarch was obtained in the form of its sodium salt. In the thus obtained sodium salt of the tricarboxystarch, a ruthenium content was 43 ppm (a ruthenium removal ratio=86%).

EXAMPLE 7

5.0 g of the product A obtained in Example 1 was dissolved in 100 g of water, and 0.5 g of 1,10-phenanthroline and 0.5 g of hydroxylamine hydrochloride were then added. The resultant mixture was heated at 94° C. for 2 hours in a 100 ml four-necked pyrex flask equipped with a stirrer, a thermometer and a reflux condenser. After cooled, the solution was transferred to a separatory funnel, and then extracted once with 77 g of nitrobenzene. The resultant aqueous phase was concentrated and methanol was then added thereto, and a tricarboxystarch was obtained in the form of its sodium salt. In the thus obtained sodium salt of the tricarboxystarch, a ruthenium content was 29 ppm (a ruthenium removal ratio=91%).

EXAMPLE 8

5.0 g of the product A obtained in Example 1 was dissolved in 100 g of water, and 0.5 g of thioxine (8-mercaptoquinoline) was then added. The resultant mixture was heated at 94° C. for 2 hours in a 100 ml four-necked pyrex flask equipped with a stirrer, a thermometer and a reflux condenser. After cooled, the solution was transferred to a separatory funnel, and then extracted once with 77 g of chloroform. The resultant aqueous phase was concentrated and methanol was then added thereto, and a tricarboxystarch was obtained in the form of its sodium salt. In the thus obtained sodium salt of the tricarboxystarch, a ruthenium content was 15 ppm (a ruthenium removal ratio=95%).

EXAMPLE 9

In a 300 ml round pyrex flask equipped with a stirrer, a thermometer and a pump were placed 50 ml of water, 2 g of corn starch and 20 mg of ruthenium chloride, and the mixture were then cooled to a temperature of 20° C. with stirring on a cold water bath. To this mixture, a 6.7 wt % aqueous sodium hypochlorite solution was added in an amount of 5 mols per mol of the starch over 4.5 hours. The pH of the reaction solution was controlled to 4.0 by adding an aqueous sodium hydroxide solution.

After completion of the reaction, ruthenium tetroxide was extracted five times with 100 ml of carbon tetrachloride to remove it. After the extraction, the pH of the reaction solution was regulated with an aqueous sodium hydroxide solution so as to be in the range of 7 to 8, and methanol was then added in an amount of a two-fold volume, thereby obtaining a white precipitate. An operation of dissolving the precipitate in water and then adding methanol to bring about precipitation was repeated twice, and the resulting white product was then dried in a vacuum at 60° C. for 5 hours to obtain 2.1 g of a product A.

The product A was analyzed by $^{13}$C-NMR, IR and ICP, and as a result, the product was a sodium salt of a tricarboxystarch in which 100 mol % of a primary alcohol at the $C_6$ position of a glucopyranose unit constituting the raw material corn starch was oxidized into a carboxyl group and simultaneously the $C_2$ and $C_3$ positions were cleaved, and 55 mol % of secondary alcohols at the $C_2$ and $C_3$ positions was oxidized into carboxyl groups. In the product, a ruthenium content was 210 ppm.

1.0 g of the product A was dissolved in 20 g of water, and 1.0 g of cyclohexanedionedioxime was then added. The resultant mixture was heated at 96° C. for 2 hours in a 100 ml four-necked pyrex flask equipped with a stirrer, a thermometer and a reflux condenser. After the solution was cooled to ordinary temperature, 40 ml of methanol was then added thereto, and a tricarboxystarch was obtained in the form of its sodium salt. The thus obtained sodium salt of the tricarboxystarch including ruthenium was analyzed by ICP, so that a ruthenium content was 6 ppm (a ruthenium removal ratio=97%).

EXAMPLE 10

Extraction was carried out in the same manner as in Example 9 except that the operation of adding 0.1 g of cyclohexanedionedioxime and then heating at 96° C. for 2 hours was replaced with the operation of stirring at 60° C. for 2 hours. An obtained sodium salt of a tricarboxystarch including ruthenium was analyzed by ICP, so that a ruthenium content was 95 ppm (a ruthenium removal ratio=55%).

EXAMPLE 11

Heating and extraction were carried out in the same manner as in Example 9 except that in place of 0.1 g of cyclohexanedionedioxime, 0.1 g of cyclohexanoneoxime was added. An obtained sodium salt of a tricarboxystarch including ruthenium was analyzed by ICP, so that a ruthenium content was 27 ppm (a ruthenium removal ratio=87%).

EXAMPLE 12

Heating and extraction were carried out in the same manner as in Example 9 except that in place of 0.1 g of cyclohexanedionedioxime, 0.1 g of dimethylglyoxime was added. An obtained sodium salt of a tricarboxystarch including ruthenium was analyzed by ICP, so that a ruthenium content was 8 ppm (a ruthenium removal ratio=96%).

EXAMPLE 13

Heating and extraction were carried out in the same manner as in Example 9 except that in place of 0.1 g of cyclohexanedionedioxime, 0.1 g of a-furyldioxime was added. An obtained sodium salt of a tricarboxystarch including ruthenium was analyzed by ICP, so that a ruthenium content was 10 ppm (a ruthenium removal ratio=95%).

EXAMPLE 14

Heating and extraction were carried out in the same manner as in Example 9 except that in place of 0.1 g of cyclohexanedionedioxime, 0.1 g of 2,2'-bipyridyl was added. An obtained sodium salt of a tricarboxystarch including ruthenium was analyzed by ICP, so that a ruthenium content was 30 ppm (a ruthenium removal ratio=86%).

EXAMPLE 15

Heating and extraction were carried out in the same manner as in Example 9 except that in place of 0.1 g of cyclohexanedionedioxime, 0.1 g of 1,10'-phenanthroline was added. An obtained sodium salt of a tricarboxystarch including ruthenium was analyzed by ICP, so that a ruthenium content was 20 ppm (a ruthenium removal ratio=90%).

EXAMPLE 16

Heating and extraction were carried out in the same manner as in Example 9 except that in place of 0.1 g of cyclohexanedionedioxime, 0.1 g of oxine was added. An obtained sodium salt of a tricarboxystarch including ruthenium was analyzed by ICP, so that a ruthenium content was 10 ppm (a ruthenium removal ratio=95%).

EXAMPLE 17

Heating and extraction were carried out in the same manner as in Example 9 except that in place of 0.1 g of cyclohexanedionedioxime, 0.1 g of 8-mercaptoquinoline was added. An obtained sodium salt of a tricarboxystarch including ruthenium was analyzed by ICP, so that a ruthenium content was 8 ppm (a ruthenium removal ratio=96%).

EXAMPLE 18

Heating and extraction were carried out in the same manner as in Example 9 except that in place of 0.1 g of cyclohexanedionedioxime, 0.1 g of diaminonaphthalene was added. An obtained sodium salt of a tricarboxystarch including ruthenium was analyzed by ICP, so that a ruthenium content was 14 ppm (a ruthenium removal ratio=93%).

EXAMPLE 19

Heating and extraction were carried out in the same manner as in Example 9 except that in place of 0.1 g of cyclohexanedionedioxime, 0.1 g of phenylenediamine was added. An obtained sodium salt of a tricarboxystarch including ruthenium was analyzed by ICP, so that a ruthenium content was 19 ppm (a ruthenium removal ratio=91%).

EXAMPLE 20

Heating and extraction were carried out in the same manner as in Example 9 except that in place of 0.1 g of cyclohexanedionedioxime, 0.1 g of 2-mercaptobenzothiazole was added. An obtained sodium salt of a tricarboxystarch including ruthenium was analyzed by ICP, so that a ruthenium content was 33 ppm (a ruthenium removal ratio=84%).

EXAMPLE 21

Heating and extraction were carried out in the same manner as in Example 9 except that in place of 0.1 g of cyclohexanedionedioxime, 0.1 g of ethylenethiourea was added. An obtained sodium salt of a tricarboxystarch including ruthenium was analyzed by ICP, so that a ruthenium content was 35 ppm (a ruthenium removal ratio=83%).

EXAMPLE 22

Heating and extraction were carried out in the same manner as in Example 9 except that in place of 0.1 g of cyclohexanedionedioxime, 0.1 g of rubeanic acid was added. An obtained sodium salt of a tricarboxystarch including ruthenium was analyzed by ICP, so that a ruthenium content was 21 ppm (a ruthenium removal ratio=90%).

What is claimed is:

1. A process for preparing a carboxypolysaccharide, comprising a first step of oxidizing a polysaccharide with a combination of a transition metal compound and an oxidizing agent, to form a reaction mixture, and a second step of separating the transition metal compound from the reaction mixture with a chelating agent, wherein the step of separating the transition metal comprises (1) a step in which the reaction mixture is treated with the chelating agent, and (2) a step in which the transition metal is extracted and removed with a water-insoluble organic solvent, and wherein the chelating agent is a dithiocarbamate represented by the formula $R^1R^2N-C(=S)-SM$ wherein $R^1$ and $R^2$ are each hydrogen, an alkyl group having 1 to 10 carbon atoms or an aryl group having 6 to 14 carbon atoms; and M is a metallic element cation.

2. A process for preparing a carboxypolysaccharide, comprising a first step of oxidizing a polysaccharide with a combination of a transition metal compound and an oxidizing agent, to form a reaction mixture, and a second step of separating the transition metal compound from the reaction mixture with a chelating agent, wherein the step of separating the transition metal comprises (1) a step in which the reaction mixture is treated with the chelating agent, and (2) a step in which the transition metal is extracted and removed with a water-insoluble organic solvent, and wherein the chelating agent is a dithiocarboxylate represented by the formula $R^3-O-C(=S)-SM$ wherein $R^3$ is an alkyl group having 1 to 10 carbon atoms or an aryl group having 6 to 14 carbon atoms; and M is a metallic element cation.

3. A process for preparing a carboxypolysaccharide, comprising a first step of oxidizing a volysaccharide with a combination of a transition metal compound and an oxidizing agent, to form a reaction mixture, and a second step of separating the transition metal compound from the reaction mixture with a chelating agent, wherein the step of separating the transition metal comprises (1) a step in which the reaction mixture is treated with the chelating agent, and (2) a step in which a water-soluble organic solvent is added to carry out extraction and to simultaneously precipitate and separate the carboxypolysaccharide, and wherein chelating agent is an oxime represented by the formula $R^4R^5C=NOH$ wherein $R^4$ and $R^5$ are each hydrogen, an alkyl group having 1 go 10 carbon atoms, an aryl group having 6 to 14 carbon atoms or a pyridyl group.

4. A process for preparing a carboxypolysaccharide, comprising a first step of oxidizing a polysaccharide with a combination of a transition metal compound and an oxidizing agent, to form a reaction mixture, and a second step of separating the transition metal compound from the reaction mixture with a chelating agent, wherein the step of separating the transition metal comprises (1) a step in which the reaction mixture is treated with the chelating agent, and (2) a step in which a water-soluble organic solvent is added to carry out extraction and to simultaneously precipitate and separate the carboxypolysaccharide, and wherein the chelating agent is an oxime represented by the formula $HON=CR^6-CR^7=NOH$ wherein $R^6$ and $R^7$ are each hydrogen, an alkyl group having 1 to 10 carbon atoms, an aryl group having 6 to 14 carbon atoms or a pyridyl group.

* * * * *